Figure 3:
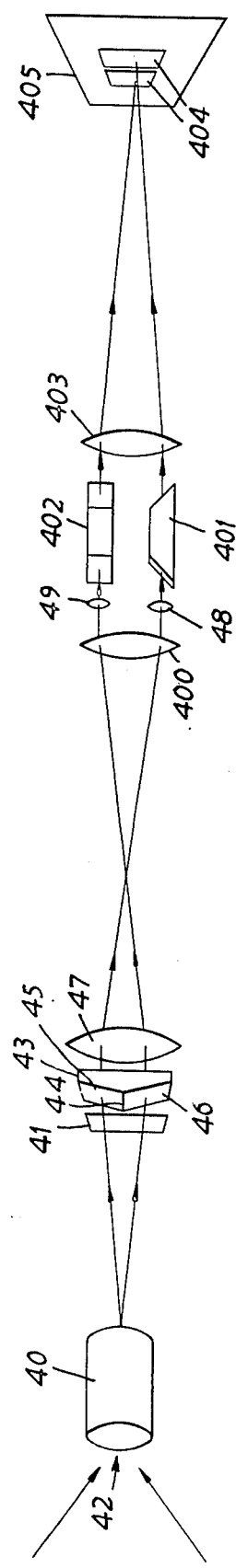

United States Patent [19]

Shelley et al.

[11] 3,932,702
[45] Jan. 13, 1976

[54] OPTICAL SYSTEM FOR THE DISPLAY OF VISUAL IMAGES

[75] Inventors: Melville Leslie Shelley, Lindfield; Archer Michael Spooner, Henley-on-Thames, both of England

[73] Assignee: Redifon Limited, London, England

[22] Filed: Nov. 29, 1972

[21] Appl. No.: 310,533

[30] Foreign Application Priority Data
Dec. 13, 1971 United Kingdom............... 57699/71

[52] U.S. Cl. ... 178/6.8; 178/DIG. 20; 178/DIG. 35; 350/170
[51] Int. Cl.² ........................................... H04N 7/18
[58] Field of Search......... 178/6.8, DIG. 20, DIG. 2, 178/DIG. 35; 350/169, 170, 174, 204, 138; 353/34

[56] References Cited
UNITED STATES PATENTS

| | | | |
|---|---|---|---|
| 3,261,912 | 7/1966 | Hemstreet............................ | 178/6.8 |
| 3,294,903 | 12/1966 | Goldmark et al..................... | 178/6.8 |
| 3,560,642 | 2/1971 | Schroader............................ | 178/DIG. 20 |
| 3,564,128 | 2/1971 | Hosterman.......................... | 178/6.7 |
| 3,659,920 | 5/1972 | McGlasson.......................... | 350/174 |

*Primary Examiner*—Howard W. Britton
*Assistant Examiner*—Michael A. Masinick
*Attorney, Agent, or Firm*—Larson, Taylor and Hinds

[57] ABSTRACT

An optical display system, particularly for providing the visual display of terrain overflown to the trainee crew of a flight simulator, and including an optical probe, closed-circuit television system and projection monitor providing a visual display scene upon a projection screen viewed by trainee crew, in which the displayed scene and the scene viewed by the probe are wide-angle and optical means are included to dissect the image into two parts, without image reduction on either axis, and to reassemble the image parts into a composite image of substantially square format, for transmission and reproduction by the television system, further optical means being used to rearrange the composite image parts to reproduce the original wide-angle scene.

Image-splitting prism devices are used to provide the square format and to reproduce the wide-angle format.

12 Claims, 6 Drawing Figures

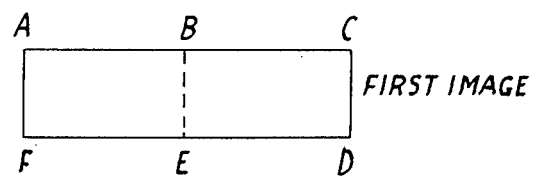
FIG. 1(a). FIRST IMAGE
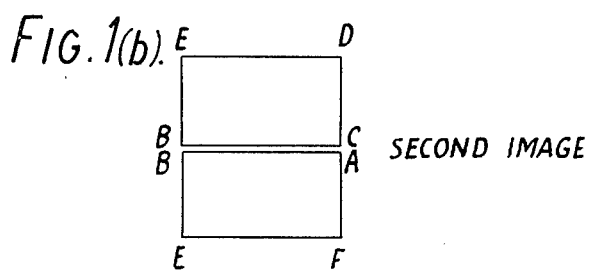
FIG. 1(b). SECOND IMAGE
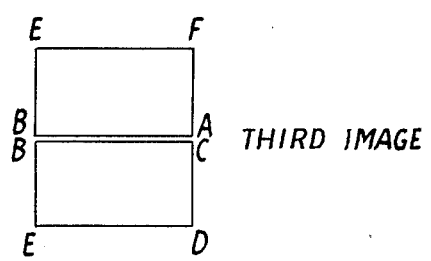
FIG. 2(a). THIRD IMAGE
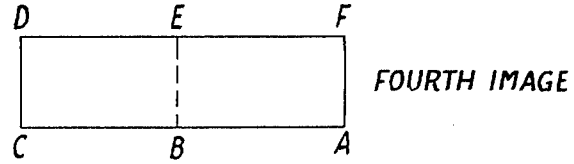
FIG. 2(b). FOURTH IMAGE

OPTICAL SYSTEM FOR THE DISPLAY OF VISUAL IMAGES

This invention relates to optical systems for the display of visual images. In particular, the invention relates to optical systems for providing a visual display in aircraft or other craft flight simulation apparatus.

In aircraft or like flight simulation apparatus, it is common practice to simulate the scene normally visible to crew through the aircraft windows using a closed circuit television camera which views an illuminated terrain model and using a television projector to reproduce an image of the scene viewed onto a screen in front of the simulator cockpit, for viewing by the trainee crew.

An optical viewing system, or "probe," used with the television camera contains provision for changing the direction of the view to simulate changes in pitch, roll and heading of the aircraft and the carriage carrying the camera and optical system may be moved to simulate changes in position and altitude.

It is the usual practice for the televison camera image and for the projected picture to have an aspect ratio of 3:4, that is, the height is three-quarters of the width, in conformity with television broadcast practice and for the horizontal angle subtended by the outer edges of the picture at the pilot's eye to be limited to an angle such as 50° or 60°.

The windows of an actual aircraft, however, subtend a much greater angle than 60° and for some manoeuvres it is desirable to provide a wide-angle view for the visual display of a flight simulator.

In principle, a probe with a wider acceptance angle can be used on the camera and the screen can be positioned nearer to the pilot, so that the projected image subtends at his eyes the greater angle accepted by the camera. If this is done, however, the definition of the scene is reduced, since the television camera and projector have a limited resolution and the resolution in a given direction on the projected picture is reduced in proportion to the increase in angle of view.

The object of the present invention is to provide an optical system for the display of visual images, using optical image transducers such as a television picture camera and television picture monitor, wherein the picture format is changed at different points in the system.

Accordingly, the invention provides an optical system for the display of visual images comprising a first optical system part for viewing an object and providing a first image having a first format, a second optical system part for dissecting said first image and providing a second image having a second format different from said first format, an electro-optic system for viewing the said second image and providing a third image, substantially reproducing said second image parts and having substantially the same, that is second, format, a third optical system part for viewing the said third image and providing a fourth image substantially reproducing the said first image parts and having substantially the same, that is first, format.

Conveniently, the said electro-optic system is a closed-circuit television system. The system thus defined enables the said first and fourth images to be wide-angle images of format, say 1:4 and the second and third images to be of square format. Thus, the image displayed has an extended horizontal angle of view, with no loss of resolution over a conventional 3:4 format, yet the image format for the closed-circuit television system has a convenient format.

The first optical system part may be the optics of the probe of a conventional flight simulator visual display system. The electro-optic system is then a closed-circuit television system having a projection type monitor and the fourth image is an image projected on to a screen which is viewed by the trainee crew in the flight simulator cockpit.

Figure 4:
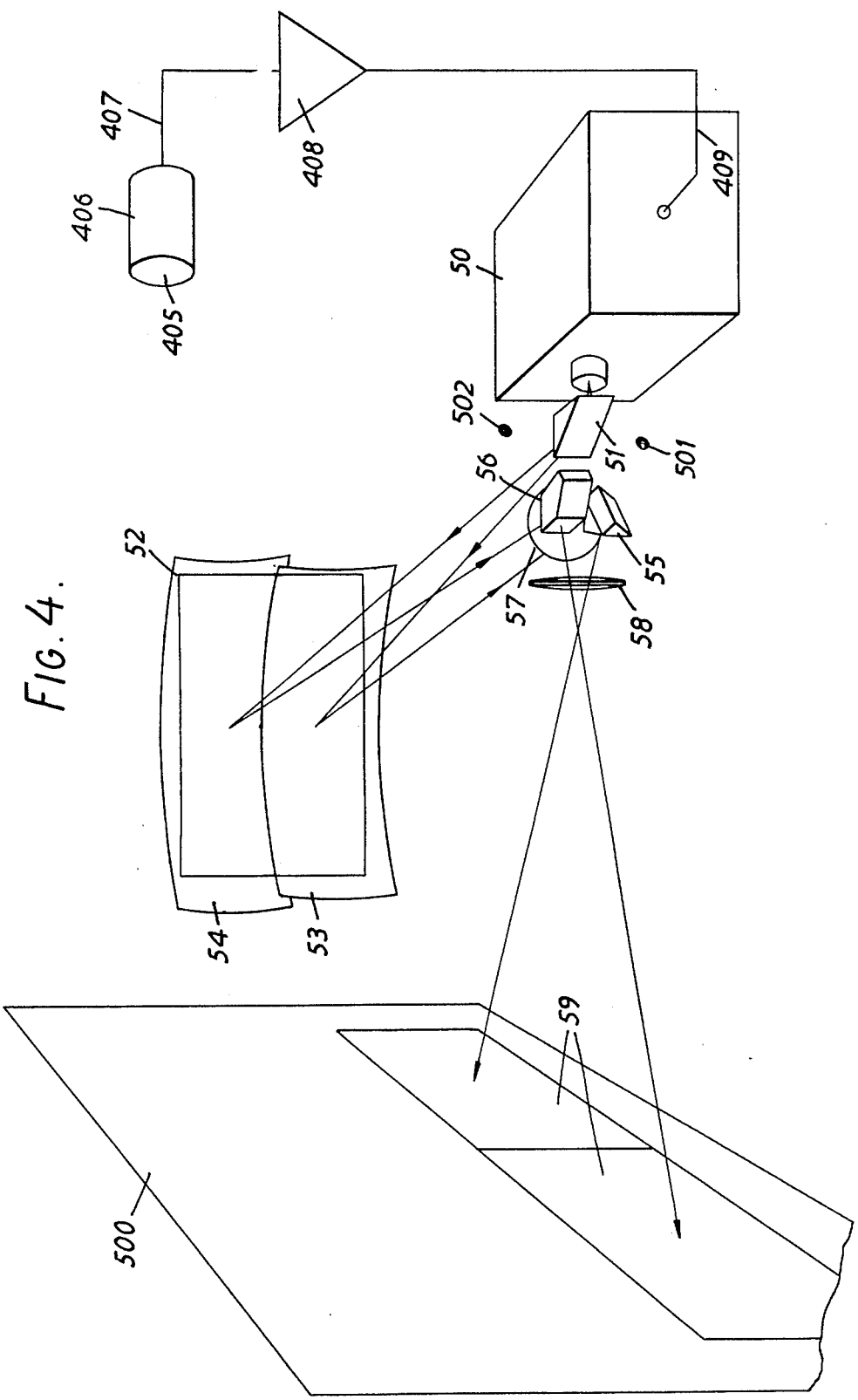

In order that the invention may be fully understood and readily carried into practice, one embodiment will now be described in detail, by way of example, with reference to the accompanying drawings, of which:

FIGS. 1a and 1b are diagrams representing, respectively, the first and second images of an optical system according to the invention;

FIGS. 2a and 2b similarly represent the third and fourth images of the system;

FIG. 3 is a diagram showing the first dissecting and recombining optical elements of the system; and FIG. 4 is a diagram showing the second dissecting and recombining optical elements of the system.

The optical system to be described with reference to the accompanying drawings is a system for viewing a scale model of terrain overflown in a simulated flight exercise and providing a projected visual display on a screen viewed by trainee crew in the cockpit of a flight simulator.

The object of the embodiment is to provide a wide-angle view to the trainee crew.

Thus, the image of the model, not shown in the drawings, provided by an optical probe, the first optical system part, is a wide-angle image, of about 1:4 in vertical: horizontal format, as shown at A,B,C,D,E and F of FIG. 1a.

This image is dissected into two parts, at the vertical line B.E, by the second optical system part and recombined as a second image, of substantially square format as shown by the two image parts E,D,C,B and B,A,F,E of FIG. 1b.

The third image of the system is a reproduction of the second image, part for part, by means of a closed-circuit television system. The third image has the same format as the second image, but the two image parts are interchanged vertically, as shown by the two image parts E,F,A,B and B,C,D,E of FIG. 2a.

The fourth image is a recombination of the two parts of the third image to provide an image of the same format as the first image and a reproduction of that first image, except that it is inverted both top to bottom and side to side, as is shown at D,E,F,A,B and C of FIG. 2b.

The square format of the second and third images is ideally suited to the camera and projection tube image areas of the closed-circuit television system.

The second, dissecting and combining optical system part includes a dissecting optical element, which is set at or near the first image surface, and which has a discontinuity along a line corresponding to the line B,C along which the first image is to be dissected. The dissecting optical element produces discontinuous deflections of the beams associated with the first image, so that two images are formed of the pupil of the first optical system. Each pupil image is associated with a single dissected part of the first image. A deflecting optical system is set at or near the pupil images, relays the dissected parts of the first image on to the second image surface.

Deflection, rotations and inversions introduced by the separate deflecting optical systems enable light associated with each dissected part of the first image to be directed to a selected part of the second image surface and the orientation of the relayed image element to be selected. The format of the second image, composed of relayed elements of the first image is thereby made different from the format of the first image.

The third image is formed by an optical projection system, in this example by a television projector having a single exit pupil. The third, dissecting and recombining, optical system part may be similar to the second optical system part. In this case a dissecting optical element, set at or near the third image, forms two images of the exit pupil of the projector.

The dissecting optical element is a refracting device, in this example a biprism. It may alternatively be a reflecting device, such as a reflecting prism or a composite mirror, with reflecting facets set at different angles.

The dissecting element may incorporate some optical power. It may include a lens, or it may have curved reflecting facets. Depending on the design of the preceding optical system, some optical power may be required in the vicinity of the dissecting element so that real multiple images are formed of the pupil of the preceding optics.

The deflecting optical systems may be refracting devices, reflecting prisms or mirror devices.

The dissecting and recombining optical system parts of the present embodiment are illustrated in FIG. 3. A first optical system part 40 forms a first image 41, see FIG. 1a, of a field of view 42, which is large in the horizontal direction and relatively narrow in the vertical direction. A biprism 43, set close to the first image plane, acts as a dissecting element. The roof edge 44, of the biprism runs vertically through the axis of the first optical system so that the biprism effectively splits the first image into two parts. Light associated with the left side of the image passes through the left side 45 of the biprism 43 and light from the right side of the image passes through the right side 46 of the biprism 43.

A field lens 47 is set close to the biprism 43. This lens 47 forms an image, through each side of the biprism 43, of the exit pupil of the first optical system. Light from the left side 45 of the biprism 43 is deflected to pass through a right pupil image 48 and light from the right side 46 of the biprism 43 is deflected to pass through a left pupil image 49.

A lens 400 is set close to the pupil images 48 and 49 and transmits light to both of them. Lenses 47 and 400 are coaxial with the first optical system. The image 41 falls in the focal plane of lens 400 so that, after passing through the lens 400, the light from both parts of the image is collimated. The collimated light then passes through inverting prisms 401 and 402. The two prisms 401 and 402 are set close to the two pupil images, so that light associated with pupil image 48 passes through prism 401 and light associated with pupil image 49 passes through prism 402. The two prisms 401 and 402 shown in FIG. 3 are dove prisms.

Prism 401 is set to invert the image 41 about the centre vertical line. Because prism 401 is a dove prism, its reflecting face is set in a vertical plane parallel to the axis of the first optical system. Prism 402 is set to invert the image 41 about the upper horizontal edge of the image. Because prism 402 is a dove prism, its reflecting face is set at an angle $\tan^{-1}(h/f)$ to the horizontal, where $h$ is the height of image 41 above the axis of the optical system, and $f$ is the focal length of lens 400. Prism 401 actually affects only the light associated with the left hand part of image 41 and prism 402 actually affects only the light associated with the right hand part of image 41. Viewed through the two inverting prisms 401, 402 the left hand side of image 41 is inverted horizontally and transposed to the right hand side, while the right hand side of image 41 is inverted vertically and transposed vertically, see FIG. 1b.

The collimated light emerging from the two inverting prisms 401, 402 is brought to a focus by a lens 403 which is set close to the inverting prisms and receives light from both of them, to form a second image 404 at a target surface 405. The second image, as shown in FIG. 1b, has the inversions and transpositions of the two parts of the first image introduced by the two inverting prisms 401, 402 as described above. The whole of the second image is also rotated 180° with respect to the first image by the rotation normally introduced on re-imaging. The format of the second image is substantially square and is therefore a suitable shape for use with a conventional television camera.

The optical system shown in FIG. 3 is suitable for incorporation in the probe of a flight simulator visual system.

Thus, in FIG. 3, the first optical system part 40 is the objective lens of the probe and the target surface 405 is the target surface of a camera tube 406 of a closed-circuit television system, as shown in FIG. 4.

The closed-circuit television system is shown diagrammatically in FIG. 4, wherein the output of camera tube 406 is shown connected by line 407 to a videofrequency amplifier 408. The output of amplifier 408 is connected by line 409 to a projector type monitor 50.

Turning now to the generation of the third and fourth images, a second dissecting and recombining optical system is shown in FIG. 4. The projector 50 projects light horizontally, by way of a simple right angle reflecting prism 51, to form the third image 52 close to a dissecting element, which consists of two concave spherical mirrors 53 and 54. The third image is a reproduction of the second image 404 produced in the apparatus shown in FIG. 3. The optical system of FIG. 4 is required to reconstitute a fourth image, see FIG. 2b, in the form of the first image 41, see FIG. 1a and reference 41 of FIG. 3.

The orientation of the final displayed image must, of course, be such as to represent correctly the original scene. The fourth image is rotated 180° by the optical system 40 of FIG. 3, but is otherwise assumed to be a faithful reproduction of the original, first image.

The mirror 53 is rectangular and has its upper edge lying in the horizontal line joining the two parts of the third image 52. The mirror 54 is set behind and above mirror 53. Mirror 53, therefore, receives light from the lower part of the third image, and mirror 54 receives light from the upper part of the third image. Mirror 53 forms an image of the projector exit pupil onto a reflecting prism 55 and mirror 54 forms an image of the projector exit pupil onto a reflecting prism 56. Both reflecting prisms 55 and 56 are set close to the projector and the right angle reflecting prism 51.

Before entering the reflecting prisms 55 and 56, the light from the primary image is collimated by a lens 57 set close to the prisms.

Prism 56 is a pentaprism which deflects all the incident light through a horizontal angle of 90° while not deflecting the light vertically. Prism 55 is a roof prism, with the roof edge set horizontally, which reflects light from the right side of the image through a horizontal angle of 90°.

Prism 56 does not rotate or invert the transmitted image. Prism 55 rotates the transmitted image through 180°. Viewing the third image 52 through the two reflecting prisms, and taking the part of the image on mirror 54 as reference, the part of the image on mirror 53 appears to be rotated 180° about its upper right hand corner, see FIG. 2a. With this relative rotation, the two parts of the third image are realigned to give the fourth image in the form required, see FIG. 2b. The collimated light leaving the two reflecting prisms is brought to a focus by a lens 58 set close to the prisms to form the fourth image 59 on a screen 500.

It will be noted that the second image, FIG. 1b, and the third image FIG. 2a are not identical, as one is a vertically transposed form of the other. This does not present a difficulty as appropriate connection of the electron beam scanning circuits of the television camera in relation to the display device will ensure the correct relative orientation.

Alternatively, a single reflection may be introduced at a position before the formation of the second image or after the formation of the third image.

The system shown in FIG. 4 is used in a flight simulator visual display, as previously stated, the video signal having been derived using a probe incorporating the optics of FIG. 3.

The displayed image 59 then depicts mostly the ground over which the simulated aircraft is flying, together with a small strip of sky along the top. Additional sky, extending the vertical field of view, may be added to the projected image by using light sources at points 501 and 502 in the diagram. These light sources are matched in intensity and colour to the portion of sky from the television system, directed at the mirrors 53 and 54, and shielded to avoid unwanted spill light.

Light from a source at 501 is focussed by the mirror 53 into prism 56 and is imaged as "sky" above the ground image derived from mirror 54. Light from a source at 502 is focussed by mirror 54 into prism 55 and is imaged as sky above the ground image derived from mirror 53.

In the systems shown in FIGS. 3 and 4, the images to be dissected, 41 and 52 respectively will not generally be in sharp focus on the respective dissecting elements, biprism 43 and mirrors 53 and 54. It is an advantage that the two parts of the image 41 in FIG. 3 should be divided along a "soft edge," since this makes later recombination in the original form less sensitive to alignment of optics. If the image 52 is FIG. 4 is out of sharp focus on mirrors. 53 and 54, the "sky" from sources at 501 and 502 may be added to the projector-produced images along a soft edge less noticeably than along a sharp edge.

In the present embodiment of the invention, relating to a flight simulator visual display, arrangements are provided to simulate aircraft pitch and roll. These arrangements may be of known form and may be provided either at the probe or at the projector.

Referring to FIGS. 1a and 1b, it will be seen that the second image is derived from the first image as by pivotting the right hand half of the first image about point B, and then reversing the resultant left to right. The right half is thereby inverted on top of the left half.

It is not essential to perform this inversion, but it will be seen that, with the inversion as described, the problem of simulating banking is simplified since, if the lines A,B,B,C either form or are parallel to the horizon, the superimposed, or parallel, lines BC, BA of the second and third images appear to pivot through an angle about point B according to the angle of aircraft banking, to provide two complementary trazepoidal image parts.

The viewed image may be projected onto a flat, a part-cylindrical or a part-spherical projection screen either by front-projection or by back-projection. Alternatively, further optical means may be used to provide a collimated image for viewing.

In the embodiment particularly described, each deflecting element provides some deflection of the incident light at each pupil image. The invention includes arrangements in which light at one or other pupil image is not deflected.

Further, in the embodiment particularly described, light passing through the different pupil images is refocussed by a common lens system. A separate focussing arrangement may be associated with each pupil image. Such separate focussing may be used to provide different magnification, or distortion or rectification of distortion within the system.

Finally, the invention has been described by an embodiment in which the first image is dissected into two parts. The optical arrangements may be extended to dissect the first image into more parts, for example three parts or four parts, from which the second image is composed.

What we claim is:

1. An optical display system, for the projection of visual images onto a viewing screen, comprising a first optical imaging system for viewing an object and providing a first image having a first format, a second optical imaging system including refracting optical elements for dissecting said first image into a plurality of rectangular picture areas and for relatively rearranging the said rectangular picture areas to provide a second sole image having a second format different from said first format, television scanning means for viewing the said second image and providing a third image, substantially reproducing said second image parts and having substantially the same (second) format, and a third optical imaging system including refracting optical elements for viewing the said third image for dissecting said third image into the same said rectangular picture areas and for projecting a fourth image substantially reproducing the said first image and having substantially the same (first) format.

2. An optical display system, for the display of visual images, comprising a first optical system for viewing an object and providing a first image having a first format, a second optical system for dissecting said first image and providing a second sole image having a second format different from said first format, said second format being substantially square, an electro optic system for viewing the said second image and providing a third image, substantially reproducing said second image parts and having substantially the same (second) format, and a third optical system for viewing the said third image and providing a fourth image substantially reproducing the said first image parts and having substantially the same (first) format, in which the said electro-optic system is a closed-circuit television and in which the said second optical system is associated with the camera tube of the closed circuit television system to provide the said second image upon the target surface thereof and said television system includes a projection type monitor providing an image from which the said third optical system provides the fourth image upon a projection screen visible to trainee crew in the flight simulator cockpit.

3. An optical display system, for the display of visual images, comprising a first optical system for viewing an object and providing a first image having a first format, a second optical system for dissecting said first image and providing a second sole image having a second format different from said first format, said second format being substantially square, an electro optic system for viewing the said second image and providing a third image, substantially reproducing said second image parts and having substantially the same (second) format, and a third optical system for viewing the said third image and providing a fourth image substantially reproducing the said first image parts and having substantially the same (first) format in which, in the second image, a dissected part of the first image is in inverted relationship to another dissected part of the first image.

4. An optical display system, for the display of visual images, comprising a first optical system for viewing an object and providing a first image having a first format, a second optical system for dissecting said first image and providing a second sole image having a second format different from said first format, said second format being substantially square, an electro optic system for viewing the said second image and providing a third image, substantially reproducing said second image parts and having substantially the same (second) format, and a third optical system for viewing the said third image and providing a fourth image substantially reproducing the said first image parts and having substantially the same (first) format, in which the said second image comprises the said first image divided substantially vertically into left-hand and right-hand portions, the said portions being reassembled the one above the other in the said second format and the uppermost of the said left-hand and right-hand portions, when reassembled to form the second image, is inverted, thereby bringing together, in the second image, the upper edges of the two said front image portions.

5. An optical display system as claimed in claim 4, in which the said first and fourth images are wide-angle images.

6. An optical display system as claimed in claim 4, in which the said second image comprises the said first image divided substantially vertically into left-hand and right-hand rectangular picture areas, the said picture areas being reassembled the one above the other in the said second format.

7. An optical display system, for the display of visual images, comprising a first optical system for viewing an object and providing a first image having a first format, a second optical system for dissecting said first image and providing a second image having a second format different from said first format, an electro optic system for viewing the said second image and providing a third image, substantially reproducing said second image and having substantially the same (second) format, and a third optical system for viewing the said third image and providing a fourth image substantially reproducing the said first image and having substantially the same (first) format, in which the said electro-optic system is a closed-circuit television system, in which the said second optical system is associated with the camera tube of the closed circuit television system to provide the said second image upon the target surface thereof and said television system includes a projection type monitor providing an image from which the said third optical system provides the fourth image upon a projection screen visible to trainee crew in the flight simulator cockpit, and in which the said second optical system comprises a biprism, mounted to dissect the said first image about a vertical dividing line, into left-hand and right-hand parts, a field lens mounted for deflecting the left-hand image part through a right pupil and the right-hand image part through a left pupil, collimating lens, first and second inverting dove prisms, the first dove prism being set to invert the left-hand image part about the said vertical dividing line and the second dove prism being set to invert the right-hand image about its upper horizontal edge, and a convex lens to provide the said second image upon the said target surface.

8. An optical display system as claimed in claim 7, in which the said third image is provided by the projection type monitor and prism means.

9. An optical display system as claimed in claim 8, in which the said third image is dissected about a horizontal dividing line into an upper image part and a lower image part by first and second spherical mirrors.

10. An optical display system as claimed in claim 9, in which the first mirror is rectangular and has an upper edge coinciding with the horizontal dividing line of the third image and the second mirror is set behind and above the first mirror, the first mirror receiving light from the lower part of the third image and the second mirror receiving light from the upper part of the third image.

11. An optical display system as claimed in claim 10, in which the third optical system comprises a collimating lens, first and second prisms and a further lens set to provide the said fourth image upon a projection screen.

12. An optical display system as claimed in claim 11, in which the first prism deflects incident light through a horizontal angle and provides an image, of the upper part of the third image, providing the right-hand part of the said fourth image, and in which the second prism deflects incident light through a horizontal angle and provides an image, of the lower part of the third image reversed left to right and inverted top to bottom, providing the left-hand part of the said fourth image, said fourth image being an inverted and reversed reproduction of the said first image.

* * * * *